Patented Apr. 2, 1946

2,397,692

UNITED STATES PATENT OFFICE 2,397,692

SURFACE ACTIVE ROSIN DERIVATIVES

Donald Price, New York, N. Y., and Everette L. May, Chevy Chase, Md., assignors to National Oil Products Company, Harrison, N. J., a corporation of New Jersey No Drawing. Original application September 13, 1941, Serial No. 410,778. Divided and this application December 6, 1944, Serial No. 566,958

4 Claims. (Cl. 260—98)

This invention relates to derivatives of rosin and allied compounds and more particularly to novel sulfonated derivatives having excellent surface active properties and to correlated improvements in the preparation of such products. The subject matter of the present invention is closely relate to application of Price and May, Serial No. 410,779, filed September 13, 1941, and entitled "Rosin derivatives," now Patent No. 2,376,382, issued May 22, 1945, wherein certain alkylated rosin derivatives and the sulfonation products thereof are disclosed and claimed and the present application is a division of the Price and May application Serial No. 410,778, filed September 13, 1941, and entitled "Surface active rosin derivatives," now Patent No. 2,376,381, issued May 22, 1945.

Rosin and allied materials afford a cheap source of uniform and reactive organic raw material and numerous products are at the present time manufactured from these substances. However, there have not heretofore been developed any rosin products, other than the rosin soaps, possessing in any substantial degree the properties of detergency, wetting power and foaming power.

It is accordingly an object of this invention to provide novel derivatives of rosin and allied substances which will possess these properties.

This object and others have been achieved by this invention in products which are formed by the sulfonation and alkylation of rosin and like substances. Preferably, each molecule of the product will contain one sulfonic group and one alkyl group of substantial length, but each rosin molecule may contain two or more of either or both of these groups. The products may be made by sulfonating the rosin compound and thereafter alkylating; or both reactions may be carried out concurrently. The present invention is confined to rosin compounds alkylated in the presence of a strong sulfonating agent, other analogous compounds being covered in the aforesaid patents of Price and May.

Rosin has been cited hereinabove as an example of a raw material for the manufacture of products according to this invention. However, instead of rosin, hydrogenated, dehydrogenated, disproportionated or decarboxylated rosin, or rosin oils may be employed. Likewise suitable are the rosin acids corresponding to the foregoing compounds, such as, for example, abietic, pimaric, sapinic and the like acids. Similarly, the glyceryl, glycol, ethylene glycol, diethylene glycol, methyl, ethyl, propyl, butyl, pentaerythritol and other esters of rosin or rosin acids, or of hydrogenated, dehydrogenated or disproportionated rosin or rosin acids may be employed. Examples of these are hydrogenated, dehydrogenated, and disproportionated ester gum; the glyceryl, glycol, ethylene glycol, diethylene glycol, methyl, ethyl, propyl, butyl, pentaerythritol and like esters of abietic, dihydroabietic and dehydroabietic acids. Hereinafter all the foregoing and allied substances will be termed generically in this specification and the appended claims as "rosin compounds."

Coming now to the alkylation of the rosin compounds which may optionally have been sulfonated beforehand, the alkyl group to be combined with the rosin substance may be any alkyl or aralkyl group containing upwards of 8 and preferably between 10 and 14 carbon atoms. Such groups may be furnished as alcohols, alkenes or naphthenes and may be condensed with the rosin material by means of any appropriate strong sulfonating agent, such as sulfuric acid, oleum or chlorsulfonic acid. The temperature at which the condensation is carried out may vary from about 20° C. to 50° C. and the reaction will be completed in about 2 to 6 hours, usually between about 2½ and 4 hours.

Suitable alcohols for furnishing the alkyl constituent include alcohols containing 8 or more and preferably from 10 to 14 carbon atoms such as octyl, nonyl, decyl, undecyl, lauryl, myristyl and the like alcohols; or any mixture of alcohols meeting the above requirements such as the mixed alcohols derived by hydrogenation of the fatty residues of various oils such as coconut oil, babassu oil, soybean oil and the like. Suitable alkenes may be derived by any conventional process such as the dehydration of the above alcohols or may be obtained from petroleum products containing unsaturated aliphatic compounds of 8 or more, preferably 10 to 14 carbon atoms.

The sulfonation of rosin products contemplated by this invention will usually take place during the condensation of the alkyl constituent with the rosin compound, the sulfuric acid or other sulfuryl condensing agent acting as a sulfonating agent. However, in some cases the conditions of alkylation may be such that the desired degree of sulfonation does not take place during that reaction, in which case the sulfonation may either precede or follow the alkylation step as described above and may be accomplished by means of any usual sulfonating agent, such as sulfuric acid, oleum sulfur trioxide, chlorsulfonic acid and the like. This reaction may conveniently be carried out by slowly mixing oleum with the alkylated or unalkylated rosin material, dissolved, if desired, in an inert solvent, and maintaining the mixture at room or only slightly elevated temperature for from about ½ to about 3 hours, after which the mixture is neutralized and the sulfonated product is isolated, if desired, by extracting it by means of suitable solvents from the neutralized mass.

Products prepared as above outlined are all readily soluble in water to form solutions which have excellent detergent and foaming properties and exert powerful wetting and penetrating actions. They are further highly resistant to hardness, acidity, and alkalinity in the media in which they are employed. These properties adapt the products to many industrial and domestic uses, such as scouring, leveling, dye penetrating and introfying, laundering, cleaning of various solid surfaces, removal of spray residues from fruit and produce, formation of emulsions for spraying, waxing, etc., stabilization of latex and many other uses of a like nature.

With the above general discussion in mind, there are set forth below specific examples of the manufacture of products according to this invention, which examples are to be considered merely as illustrative and not in any limiting sense. All parts given are by weight.

Example I 10 parts (1 mol) of rosin and 6 parts (1 mol) of lauryl alcohol were mixed and warmed on a water bath until a homogeneous mixture was obtained. The mixture was cooled to 20° C. and 14 parts of 20% oleum were added slowly with stirring at temperatures maintained between 20° C. and 30° C. The reaction was completed by stirring at room temperature for 3 hours, after which the mass was poured into 45 parts of 30° Bé. NaOH and the pH was adjusted to 8.5. The neutralized mass was evaporated to dryness. The resulting product, which contained monolauryl rosin monosulfonate as the active ingredient, was an efficient detergent characterized by strong foaming, wetting and penetrating powers.

Example II 10 parts (1 mol) of rosin and 6 parts (1 mol) of the alcohols derived by the reduction of coconut oil fatty acids were mixed and warmed on a water bath until a homogeneous mixture was obtained. The mixture was cooled to 20° C. and 14 parts of 20% oleum were added gradually with stirring at temperatures maintained between 20° C. and 30° C. The reaction was completed by stirring at room temperature for 3 hours, after which the mass was poured into 45 parts of 30° Bé. NaOH and the pH was adjusted to 8.5. The neutralized mass was evaporated to dryness. The product exhibited excellent wetting and detergent properties.

Example III 10 parts (1 mol) of rosin and 5 parts (1 mol) of decanol were mixed and warmed on a water bath until a homogeneous mixture was obtained. The mixture was cooled to 20° C. and 14 parts of 20% oleum were added slowly with stirring at temperatures maintained between 20° C. and 30° C. The reaction was completed by stirring at room temperature for 3 hours, after which the mass was poured into 45 parts of 30° Bé. NaOH and the pH was adjusted to 8.5. The neutralized mass was evaporated to dryness. The product exhibited excellent wetting and detergent properties.

Example IV 10 parts (1 mol) of rosin, 7 parts (1 mol) of myristyl alcohol and 7 parts of ethylene dichloride were mixed and warmed on a water bath until a homogenous mixture was obtained. The mixture was cooled to 20° C. and 14 parts of 20% oleum were added gradually with stirring at temperatures maintained between 20° C. and 30° C. The reaction was completed by stirring at room temperature for 3 hours, after which the mass was poured into 45 parts of 30° Bé. NaOH and the pH was adjusted to 8.5. The neutralized mass was evaporated to dryness. The product exhibited excellent wetting and detergent properties.

Example V 10 parts (1 mol) of dehydroabietic acid ("Galex" manufactured by the National Rosin Oil and Size Co. of Savannah, Georgia) and 12 parts (2 mols) of the alcohols derived by the reduction of coconut oil fatty acids were mixed and warmed on a water bath until a homogeneous mixture was obtained. The mixture was cooled to 20° C. and 18 parts of 20% oleum were added slowly with stirring at temperatures maintained between 20° C. and 25° C. The reaction was completed by stirring at room temperature for 3 hours, after which the mass was poured into 60 parts of 30° Bé. NaOH and the pH was adjusted to 8.5. The neutralized mass was evaporated to dryness. The product, the active ingredients of which were sulfonated dehydroabietic acids largely dialkylated with the coconut oil fatty residues, exhibited excellent detergent powers.

Example VI

Abietic acid was substituted for the "Galex" in the procedure of Example V. The product was an excellent detergent and wetting agent.

Example VII 10 parts (1 mol) of ester gum and 6 parts (1 mol) of coconut fatty alcohols were warmed, mixed and cooled to 25° C. 14 parts of 20% oleum were added slowly with stirring. Stirring was continued at room temperature for 3 hours. Thereafter the mass was poured into 45 parts of 30° Bé. NaOH and the pH adjusted to 7.5. The neutralized mass was extracted with butanol and the butanol distilled off from the extract solution to leave the sulfonated product in salt-free condition. This product was an excellent detergent, freely soluble in water.

Example VIII

The procedure of Example VII was followed, except that the quantity of coconut fatty alcohols was increased to 12 parts (2 mols) and the oleum was increased to 18 parts. An excellent surface-active agent resulted.

Example IX 10 parts (1 mol) of rosin oil and 6 parts (1 mol) of coconut fatty alcohols were warmed, mixed and cooled to 20° C. 18 parts of 20% oleum were added with stirring, the temperature being maintained between 15° C. and 25° C. Stirring was continued at room temperature for 3 hours. Thereafter the mas was poured into 60 parts of 30° Bé. NaOH and the pH adjusted to 7.5. The mass was evaporated to dryness, leaving a sulfonated product having the same excellent properties characteristic of the other products aforementioned.

Example X 6 parts (1 mol) of the trihydrate of dehydroabietic acid sulfonate ("Galex" sulfonic acid) and 5.5 parts (2 mols) of the alcohols derived by the reduction of coconut oil fatty acids were mixed and 11 parts of 20% oleum were added with stirring over a period of 30 minutes while maintaining the temperature between 30 and 35° C. The mass was maintained at 35° C. while stirring for three and one-half hours and then neutralized by pouring the same into 35 parts of 30° Bé. soda and adjusting the pH to 7.5 to 8.0. The water was evaporated from the mass under reduced pressure yielding 25 parts of a light-colored solid (40% active) having excellent detergent properties.

It will thus be seen that there is provided by this invention a class of surface active compounds which may be easily and cheaply prepared from readily and cheaply procurable starting materials. These products are all characterized by outstanding detergent, wetting and foaming powers and by their retention of these powers in spite of the acidity, alkalinity and hardness of the media in which they are used.

The expression "sulfonated" is used herein to connote both the sulfonic acid derivatives as well as the corresponding alkali metal, ammonium and like salts thereof.

Since certain changes in carrying out the above process and certain modifications in the product which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention which as a matter of language might be said to fall therebetween.

Having described our invention, what we claim as new and desire to secure by Letters Patent is:

1. A process of producing novel surface active compounds which comprises reacting a sulfonated compound selected from the group consisting of sulfonated rosin; sulfonated hydrogenated, sulfonated dehydrogenated, sulfonated disproportionated and sulfonated decarboxylated rosin; the free acids corresponding to sulfonated rosin and sulfonated hydrogenated, sulfonated dehydrogenated and sulfonated disproportionated rosin; and esters of the aforementioned acids; with a compound selected from the class consisting of aliphatic alcohols and alkenes having ten to fourteen carbon atoms in the presence of a strong sulfonating agent.

2. A process of producing novel surface active compounds which comprises reacting a sulfonated rosin with a compound selected from the class consisting of aliphatic alcohols and alkenes having ten to fourteen carbon atoms in the presence of a strong sulfonating agent.

3. A process of producing novel surface active compounds which comprises reacting a sulfonated rosin oil with a compound selected from the class consisting of aliphatic alcohols and alkenes having ten to fourteen carbon atoms in the presence of a strong sulfonating agent.

4. A process of producing novel surface active compounds which comprises reacting a sulfonated dehydroabietic acid with a compound selected from the class consisting of aliphatic alcohols and alkenes having ten to fourteen carbon atoms in the presence of a strong sulfonating agent.

DONALD PRICE.
EVERETTE L. MAY.